Dec. 8, 1970  A. MARZOCCHI ET AL  3,545,293

INDUSTRIAL BELT CONSTRUCTION

Filed Dec. 27, 1968

INVENTORS
ALFRED MARZOCCHI
DAVID E. LEARY

BY

ATTORNEYS

United States Patent Office 3,545,293
Patented Dec. 8, 1970

3,545,293
INDUSTRIAL BELT CONSTRUCTION
Alfred Marzocchi and David E. Leary, Cumberland, R.I., assignors to Owens-Corning Fiberglas Corporation, a corporation of Delaware
Filed Dec. 27, 1968, Ser. No. 787,409
Int. Cl. F16g 1/10
U.S. Cl. 74—231    8 Claims

ABSTRACT OF THE DISCLOSURE

An industrial belt construction which has embedded, interiorly therein, glass, in any one of a variety of forms, serving as an interior reinforcement, a heat barrier and a fire resistant skeleton, reducing and/or precluding belt failure due to repeated contact with articles which are hot and normally cause belt deterioration and/or failure.

---

The present invention relates to industrial belts employed by industry in a variety of applications including fractional horsepower V-belts, timing belts, linking belts, conveyor belts, etc.

More particularly, the present invention relates to industrial belts which feature a unique system of reinforcement which possesses multi-functional utility.

The present invention will be described in terms of a conveyor belt construction since the attributes are most evident in this application.

Industrial belts have been traditionally reinforced with textile materials such as cotton, rayon, nylon, etc. These textiles are sometimes employed in the form of multi-filament and multi-strand cords and frequently in the form of a woven sheet. The belt may feature one or more plies of reinforcement, depending upon the demands of the particular application. The textile reinforcement is employed in order that the belt will resist elongation in the particular service application wherein, in most applications, the belt is carried on a pair of spaced pulleys, one of which is driven by an available source of power, usually a motor. Continued rotation under load conditions will cause a belt containing no reinforcement to quickly elongate whereby the belt slips on the pulleys and no longer functions in the desired manner. Understandably, the conventional textile materials, being organic, have inherent limitations as a reinforcement against elongation. More recently, glass has been suggested as a candidate reinforcement for industrial belts. Glass, of course, possesses a number of very desirable properties which lend themselves to belt reinforcement. Thus, a filament of glass possesses a tensile strength of about 500,000 pounds per square inch. Glass also has an extremely high modulus of about 322 grams per denier, coupled with a low elongation in the neighborhood of 3% or less. Furthermore, glass has a low moisture absorptivity of essentially zero and, lastly, possesses essentially 100% elastic recovery.

While glass possesses what appear to be desirable attributes, as described just above, the incorporation of glass successfully into rubber as a reinforcement presents a number of difficulties. In the first place, the compatibility of the glass with rubber and the adhesiveness of glass to rubber is not as desirable as with the organic fibers. In the first place, it is inorganic rather than organic as the others. Secondly, it has a completely smooth and impervious surface as compared to most textiles. These problems have been largely overcome through the development of sizes, coatings and combination size and impregnation coatings which provide a high degree of adhesion of the glass to the rubber matrix. These adhesion and compatibility promoting sizes and coatings represent inventions which are embodied in a number of patent applications assigned to the same assignee as the present application. Included among these is Ser. No. 218,723, filed Aug. 22, 1962, now U.S. Pat. No. 3,252,278.

Over and above the adhesion difficulty, of course, it must be appreciated that glass possesses a number of properties or characteristics which are markedly different in numerical value from those possessed by the conventional organic reinforcing materials. By way of example, in stiffness expressed in grams per denier, glass has a value of 322 while cotton has a value of 60; Dacron (a polyester) a value of 21; viscose rayon a value of 0.2; nylon a value ranging from 18 to 23; and Orlon (an acrylic) a value of 10. These values demonstrate a difference factor ranging from 5 to 1000. In breaking elongation expressed as a percent, glass has a value of 3–4; Dacron (a polyester) has a value of 19–25; viscose rayon has a value ranging from 15–30; nylon a value of 25–40; and Orlon (an acrylic) a value of 25. These latter demonstrate a difference factor in the order of magnitude of from about 4 to 10. In average toughness (calculated as—elongation × load at failure divided by 2), glass has a value of 0.07 pound-inch; Dacron (a polyester) a value of 0.5 pound-inch; viscose rayon a value of 0.19 pound-inch; nylon a value of 0.75 pound-inch; and Orlon an acrylic) a value of 0.4 pound-inch. Here, the difference factor ranges from 2 to 10. By way of further illustration, glass has a specific gravity of 2.54. In contrast, Dacron (a polyester) has a specific gravity of 1.38; viscose rayon 1.46; nylon 1.14; and Orlon (an acrylic) 1.14. Thus, it can be seen that glass is almost twice as dense as the conventional organic fibers. Therefore, a consideration of how to incorporate glass into rubber as a reinforcement for industrial belts involves not a matter of substituting glass fiber for the organic fiber, but rather presents a number of problems; several of which are believed solved by the present invention.

A particularly vexing problem which is encountered in many industries is the susceptibility of conventional conveyor belts to fail or to be short lived in applications requiring the conveying of articles, items, or goods which are quite hot. Examples include slag, metal castings, etc. Neither rubber nor the conventional organic textile reinforcements are very tolerant toward heat. Most all of the known rubbers of today commence to deteriorate at a temperature of about 350° F. Higher temperature will result in the rubber becoming overvulcanized, eventually leading to reversion or depolymerization. This is evidenced by loss of elastic properties and eventually gumminess and tackiness. Finally, rubber itself will burn, as will most of the organics. Many of the organic textile reinforcing materials, of course, lose their tensile strength and consequently their reinforcing properties at relatively low temperatures and melt at not much higher. Additionally, textile materials elongate and exhibit permanent set or stretch. In the steel, coal and many mining industries, the continuous movement of extremely hot materials by conveyor is a necessity. Metal link belts can be used and wire reinforced belts can sometimes be used. However, these are quite expensive and require extensive maintenance due to wear and abrasion. Also, wire, being metal, will exhibit crystallization and work hardening, leading to failure.

Another problem encountered in the employment of the natural and synthetic organic textile materials as an interior reinforcement for rubber resides in the fact that these materials are generally hygroscopic or, stated perhaps more broadly, are possessed of a considerable degree of absorbency. This absorbency results in a bleeding from the surrounding rubber of the residual low molecular weight hydrocarbons present after vulcanization, processing oils, plasticizing agents, softeners, etc.; all of which substances lend to rubber its elasticity, resilience and general liveliness or bounce. Naturally, this is a matter of compromise. As referred to earlier, rubber without reinforcement would not be very suitable as an industrial belt such as a conveyor belt since its inherent resistance to elongation is not sufficient. Accordingly, in reinforcing a belt with a textile cord or fabric, it is being made suitable for use as a conveyor or drive belt, but at the same time it is, by reason of the foregoing phenomena, losing some of the very desirable properties of rubber. This is of particular significance in the upper surface of the belt which is usually in tension, at least more so than the underside of the belt. Thus, in passing about the pulley, the outer surface or skin of the belt must elongate whereas, in fact, the underside of the belt is, for all intention and purpose, in compression. Also of significance is the fact that the underside passes from a state of compression to a state of tension as it moves from contact with the pulley to a region not in contact with the pulley.

With the foregoing introduction in mind, it is an object of the present invention to provide an industrial belt construction which features a unique employment of a mineral type material as an interior reinforcement.

It is also an object of the present invention to provide a conveyor belt which is elastomeric, yet is capable of enduring contact and exposure to heat above the level of that capable of endurance by belts known heretofore.

It is additionally an object of the present invention to provide such a belt which features the conventional organic reinforcement in addition to the glass reinforcement.

It is still another object of the present invention to provide a belt construction which includes a multi-functional reinforcement capability; namely, reinforcement, retention of natural elasticity and resistance to thermal deterioration.

The foregoing, as well as other objects of the present invention, will become apparent to those skilled in the art from the following detailed description taken in conjunction with the annexed sheet of drawings on which there are presented, for purposes of illustration only, several embodiments of the belt construction of the present invention plus a schematic illustration of one step in the treatment of the reinforcement member of the present invention.

Figure 1:
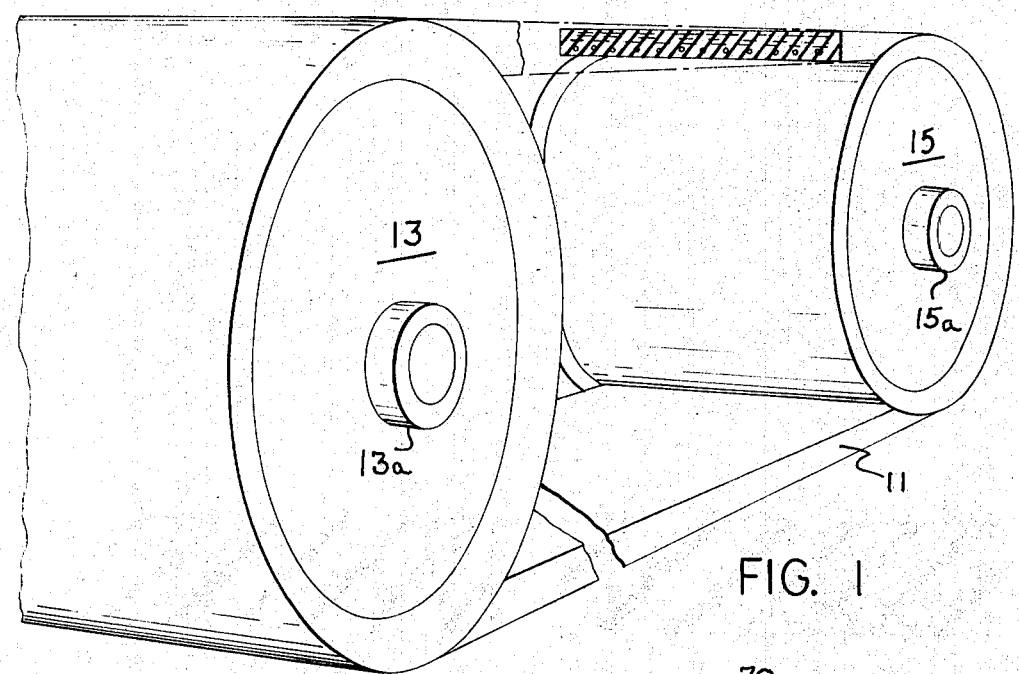
FIG. 1 is a three-quarter perspective view of a conveyor belt mounted on two spaced rollers; the belt being sectioned to show the interior.

Viewed most simply, the present invention envisions a belt featuring conventional textile reinforcement and, between the textile reinforcement and the load carrying surface of the conveyor belt, a network of glass disposed to lend structural integrity to the belt as well as serving as a thermal barrier.

Referring now more specifically to the drawings, a conveyor belt 11 is mounted upon two spaced drums or rollers 13 and 15, rotating about their respective axles 13a and 15a. One of the rollers is driven by a suitable source of rotative power (not shown) and the other is mounted for free rotation. The belt 11 is shown in more detail in FIG. 3. The belt is not shown in a true section, that is, the section lines have been deleted, in the interest of clarity; their presence otherwise obscuring an understanding of the interior structure. In the belt 11, reference numeral 17 identifies a reinforcement cord of organic material, such as nylon; the cord being made up of a multiplicity of continuous nylon filaments. The cord 17 extends in a continuous spiral path in repeated courses from one side of the belt to the other. Situated above the side-by-side array of cords is a network of glass generally identified by the numeral 19. In this embodiment, the array is in the form of a large multiplicity of chopped glass cords ranging from ⅛ up to 1 inch in length and evn up to 3 to 6 inches and disposed in generally parallel array transverse to the longitudinal axis of the belt but with their individual ends in mutually overlapping, staggered relationship. The relative thickness of the network 19 or layer is somewhat exaggerated in FIG. 3, again in the interest of clarity.

Figure 4:
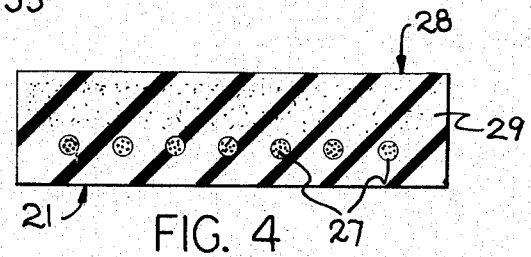
FIGS. 4-6 are additional enlarged sectional views of conveyor belt constructions illustrating variant embodiments in accordance with the present invention.

In the embodiment of FIG. 4, conveyor belt 21 contains a textile, spiral-wound cord reinforcement 27 and situated thereabove and below the upper surface 28 a large multiplicity of glass yarns and strands of relatively small size; such being identified by the reference numeral 29. The individual elements of glass are present in a fairly dense proportion, ranging in the neighborhood of 35 to 50 parts per hundred of rubber.

Figure 5:
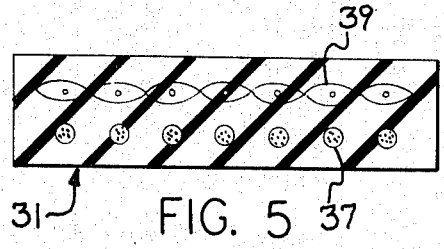

In the embodiment of FIG. 5, the conveyor belt 31 features a textile cord reinforcement 37 and thereabove a network of glass 39 in the form of a woven glass sheet good extending completely across the width of the belt and completely about the belt.

Figure 6:
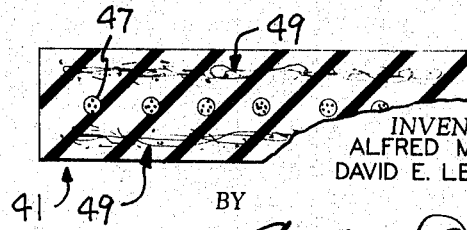

In FIG. 6, the conveyor belt 41 includes textile cord reinforcement 47 and, above and below, a network of glass 49 in the form of a nonwoven mat composed of a large multiplicity of glass filaments or strands. U.S. Pat. No. 3,265,481 assigned to the same assignee as the present application discloses an apparatus for forming one type of nonwoven mat useful in the manufacture of belts as described herein.

The staggered, mutually overlapping chopped glass cords 19 are preferably composed of a plurality of yarns combined together with or without twist. The yarns are themselves in turn formed of a plurality of strands; each of which is composed of a large multiplicity of individual glass filaments ranging in number from several hundred up to as many as 2,000. Generally, a strand is formed by attenuating several hundred or more filaments pulled from a like number of orifices in the bottom of a platinum bushing containing the molten glass. Individual filaments are drawn together upon attenuation, coated with a preselected size and wound on a collet into a package containing a large supply of the size-bearing strand. A plurality of the strands are combined together in a rewinding operation either with or without twist, to form a multiple strand yarn. Then a plurality of the strands are rewound and combined with or without twist to form a cord. The cord, as indicated, is thus composed of a great plurality of filaments; each bearing a size.

The cord, in accordance with a preferred embodiment of the present invention, is drawn from a spool 50 (FIG. 2) and passed over a series of guide rollers 51, 52, 53 and 54 into a container 56 containing a bath of an impregnant material, which will be described in more detail hereinafter. Excess impregnant is removed by passage of the impregnated cord through wiping dies 61; the excess dripping back down into the container 56 via the lip 62 thereon. The impregnated cord then passes through a hot air oven 70 maintained at about 350–750° F. wherein the impregnant is dried and partially cured to an intermediate stage of vulcanization. The impregnated cord is then wound on a spool 72.

The impregnated cord is conveniently chopped into any length desired, using any one of a variety of commercial cutting devices. The chopped cords can then be combined with rubber, either by Banbury mixing, milling or calendering; care being taken to avoid material or substantial breakup of the cords. Careful control of milling or calendering will find orientation of the chopped cords occurring. It is also appropriate to employ a sorting or orientation machine which arranges the short lengths of cords so that an appreciable proportion of them are in generally parallel relationship. They are then allowed to pass in their parallel arrangement from an appropriate conveyor onto a continuously moving thin sheet of unvulcanized rubber which is then combined with another continuously moving sheet of unvulcanized rubber to form a sandwich with the chopped cords disposed interiorly thereof in generally parallel staggered orientation. Several of the sandwich structures can be combined to yield a sheet which, when incorporated into a conventional conveyor belt manufacturing operation, will form a conveyor belt containing the staggered array of chopped lengths illustrated in FIG. 3.

Figure 3:
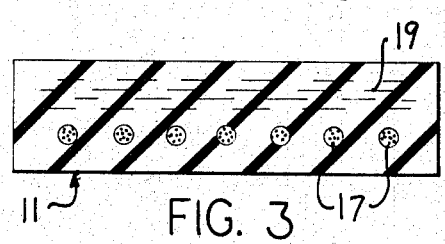
FIG. 3 is an enlargement of the sectional part of the belt shown in FIG. 1, with cross-hatching omitted for purpose of clarity.

The conveyor belt illustrated in FIG. 3 is thus reinforced in its upper region with a large plurality of chopped impregnated glass cords in staggered overlapping relationship. The ultimate vulcanized belt is possessed of a greater degree of resilience, elasticity and like properties that a like conveyor belt containing a textile reinforcement in the upper region of the conveyor belt. As a consequence, the belt in continued use which finds the upper surface subjected to tension is of much longer life due to the increased elasticity. In addition, the conveyor belt as illustrated in FIG. 3 will endure the temperature associated by hot slag, cinders or the like carried on its upper surface since the elastomer itself is inherently more resilient, as described, and, furthermore, the perhaps heat sensitive organic cord is beneath the network of staggered glass chopped cords; the latter serving as a heat barrier. Furthermore, should the rubber ignite or slowly commence a path of deterioration, e.g., charring, and disintegration, tending to propagate itself deeper into the belt, such propagation is interrupted by the network of glass. The presence of glass appears to inhibit the propagation; the presence of the glass appearing to raise the ignition temperature of the surrounding rubber and further tending to promote the formation of a coating of the charred rubber; which coating is less ignitable than the rubber alone or prior to the carring. Furthermore, the glass network lends a skeletal integrity to the belt whereby it will last much longer than otherwise even though apparently fairly damaged.

The embodiment of FIG. 4 represents a less preferred practice of the present invention since the network of glass will not impart the structural integrity to a belt to the same degree as the other embodiments. The network of glass 29 is prepared by mill mixing a quantity of the chopped cords into a bath of the appropriate rubber composition. In this case, the milling is allowed to continue until the cords are substantially broken up into individual filaments and the filaments, in turn, broken up into essentially short lengths of $\frac{1}{16}$ of an inch or under. The proportion of glass, however, is quite large, in the neighborhood of 50 parts per hundred of rubber, whereby the glass functions as a thermal barrier while, at the same time, it performs a general reinforcing function without any adverse effects on the inherent resilience, elasticity or bounce of the rubber involved.

In the belt 31 illustrated in FIG. 5, the network of glass is in the form of a woven material; the yarns and strands thereof being formed of a multiplicity of glass filaments. The formation of glass into appropriate woven pattern is well understood and need not be gone into in detail herein.

Figure 2:
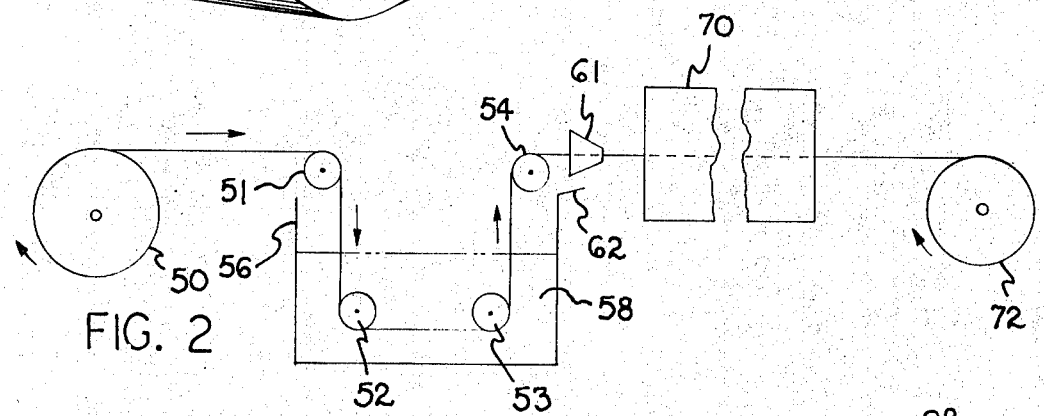
FIG. 2 is a schematic side elevation view of an impregnation operation for the glass bundle employed as a reinforcement.

In the embodiment illustrated in FIG. 6, the belt has the network of glass 49 in the form of a nonwoven mat which has been referred to earlier herein. The strands or yarns making up the woven network 39 and/or the nonwoven mat 49 are desirably either impregnated while in the form of strand or cord as described in the description of FIG. 2, or the woven sheet good and nonwoven mat can be impregnated as a continuous woven sheet good or a continuous nonwoven mat. In the latter case, an approach, a technique or setup as illustrated in FIG. 2 is eminently suitable. Alternatively, in the case of the sheet good, a roller coating or "kiss" coating technique may be employed to apply the impregnant coating thereto.

As referred to earlier herein, the glass filaments are desirably treated with a size usually applied as the filaments are drawn from the bushing. A suitable size is composed of 0.5–2.0 percent by weight of gamma-aminopropyltriethoxy silane, 0.3–0.6 percent by weight glycerine and the remainder water. Such a formulated size is quite fluid and suitable for application by spray.

An impregnant composition which has been found to be eminently satisfactory in terms of compatibility with the size and compatibility with a variety of rubber, natural and/or synthetic, blends is composed of 60 parts by weight Lotol 5440 and 39 parts by weight water. Lotol 5440 is manufactured by U.S. Rubber Company and is a 38% dispersed solids system including a butadiene-styrene-vinyl pyridine terpolymer latex, a butadiene styrene latex and a resorcinol-formaldehyde resin. This impregnant bath has a viscosity just slightly thicker than milk and approaching the thickness of cream.

Returning to the drawings, it can be seen that in the several embodiments illustrated, the network of glass serving in its multi-functional capacity is located in the upper segment of the belt. By upper segment is meant the segment above the organic cord reinforcement and just below the outer surface of the conveyor belt, normally used in transporting the articles or goods concerned. It is within the framework of the present invention to employ a network of glass of any of the forms illustrated, not only in the upper segment as described but in the lower segment which may be described as that segment of the belt between the organic reinforcement and the inner surface of the conveyor belt normally in contact with the pulleys, drive rollers or the like. Such a construction has utility where the particular use of the belt finds the lower surface of the conveyor belt exposed to an elevated temperature or likely to contact "hot spots" in the course of its travel. FIG. 6 illustrates the just-described embodiment wherein the organic cord 47 is sandwiched between two layers 49 of a glass network embedded in the elastomeric matrix body member; each of the layers 49 serving as a thermal barrier and also as an internal skeleton. The layers 49 are composed of a nonwoven mat as described earlier herein.

A conveyor belt constructed in accordance with the present invention is highly desirable since the principal reinforcement constitutes the relatively conventional, readily available and, therefore, quite inexpensive organic materials. At the same time, by reason of the construction herein disclosed, this organic principal reinforcement is shielded by a thermal barrier which, even under quite critical conditons wherein the belt might otherwise separate, is held together by the network in the nature of an interior skeleton, as it were.

The belt construction of the present invention features an organic cord as the principal reinforcement under normal operating conditons. The various layers of glass, whether as chopped cords, chopped filaments, a woven fabric or a nonwoven fabric, are secondary reinforcements and primarily serve as barriers against heat degradation. Thus, as manufactured, the amount and disposition of the glass network should not constitute, by reason thereof, an influence precluding operation of the organic as the principal reinforcement. Thus, the glass network should not absolutely prohibit elongation of the belt as otherwise determined by the character of the organic material of which the principal cord is composed. The effect of the glass network in this regard is controlled by the amount of glass in the network and/or the disposition of the glass in terms of the angular relationship of the cords with respect to the longitudinal axis of the belt or the character of the weave or the pattern of the glass strand or cord fabric.

In the case of a glass strand fabric, the strands, in terms of their ultimate length with respect to a given segment of length of the belt, should be sufficient to allow elongation of the belt as otherwise limited by the principal organic cord reinforcement. Of course, the glass network may operate to influence to some degree the effect of the principal organic cord reinforcement. Likewise, of course, should heat encountered by the belt in its particular use cause any deteriorations of the principal organic cord reinforcement leading to undesired increase in possible elongation or cause degradation of the principal organic cord reinforcement, then the glass network will be available as a secondary reinforcement limiting any further undesirable elongation.

From the foregoing, it is seen that in accordance with the present invention there is provided an industrial belt construction which includes provision for protecting a principal organic cord reinforcement in the nature of a heat barrier shielding the organic cord and at the same time serving as a secondary reinforcement in the event of organic cord deteriorations or failure due to heat or, for that matter, any condition attacking the principal organic cord reinforcement.

Additionally, as indicated earlier herein, the glass network reinforcement is effective in the manner described without accompanying decrease in or loss of elasticity, verve, life, bounce, etc., as usually caused by the presence of organic or natural (cotton, etc.) textile or cord in the elastomeric body of the belt.

In the interest of conciseness, the present description has been largely devoted to the details of description, etc., of the belt interior constructions themselves. The manner of combining the various chopped cords, woven fabric, etc., are so extremely well known and understood in the art of manufacturing industrial rubber goods that to include a detailed description of the manufacture of belts would be redundant. Thus, milling, calendering, etc., are all areas of technology which would be employed in the manufacture of conveyor and other industrial belts.

From the foregoing description, many skilled in the art will readily discern that modifications and substitutions may be made and it is intended to include such relatively obvious variations, modifications and substitutions unless such are clearly violative of the language of the appended claims.

We claim:
1. An annular belt inclusive of:
    a principal elastomeric matrix,
    a principal organic cord reinforcement located interiorly thereof, said belt having spaced inner and outer surfaces; and
    an upper segment extending from proximate the outer surface to proximate said reinforcement, said segment containing a heat barrier embedded therein generally coextensive with said outer surface, said heat barrier comprising glass in the form of one of the group consisting of filaments, chopped bundles, nonwoven mat, woven sheet good and mixtures thereof.
2. The belt as claimed in claim 1, wherein said glass is in a pattern of distribution as forms a network lending structural integrity to the belt when damaged by elevated temperature sufficient to cause deterioration of the other components.
3. The belt as claimed in claim 1, wherein said glass is in the form of chopped bundles oriented generally randomly transverse to the longitudinal axis of the belt and in mutually staggered overlapping relationship viewed in vertical section.
4. The belt as claimed in claim 1, wherein said glass is present in the form of a plurality of short lengths, one of the group consisting of filaments, yarns, cords and mixtures thereof, said lengths measuring not in excess of about $\frac{1}{16}$ of an inch and said lengths are randomly distributed.
5. The belt as claimed in claim 4, wherein said glass measures from 2 to about 50 parts by weight per hundred of rubber.
6. The belt as claimed in claim 1, which includes a heat barrier on both sides of said interior principal reinforcement.
7. The belt as claimed in claim 1, wherein said glass items recited bear an elastromeric impregnant.
8. The belt as claimed in claim 1, wherein said principal reinforcement is formed of a cord of organic material extending in repeated spirals longitudinally of said belt.

References Cited
UNITED STATES PATENTS

| | | | |
|---|---|---|---|
| 1,578,727 | 3/1926 | Harshton | 74—232X |
| 1,698,035 | 1/1929 | Tobey | 74—232 |
| 1,834,606 | 12/1931 | Davis | 74—232 |
| 2,633,227 | 3/1953 | Hutchins | 74—232 |
| 3,122,934 | 3/1964 | Fihe | 74—232 |
| 3,416,383 | 12/1968 | Jensen | 74—233 |

FOREIGN PATENTS

| | | | |
|---|---|---|---|
| 874,956 | 8/1961 | Great Britain | 74—232 |

JAMES A. WONG, Primary Examiner